(12) United States Patent
van Zwol et al.

(10) Patent No.: US 9,870,517 B2
(45) Date of Patent: Jan. 16, 2018

(54) IMAGE OBJECT RETRIEVAL

(75) Inventors: Roelof van Zwol, San Francisco, CA (US); Lluis Garcia Pueyo, San Francisco, CA (US)

(73) Assignee: Excalibur IP, LLC, New York, NY (US)

( * ) Notice: Subject to any disclaimer, the term of this patent is extended or adjusted under 35 U.S.C. 154(b) by 549 days.

(21) Appl. No.: 13/315,210

(22) Filed: Dec. 8, 2011

(65) Prior Publication Data
US 2013/0148903 A1  Jun. 13, 2013

(51) Int. Cl.
*G06K 9/00* (2006.01)
*G06K 9/62* (2006.01)
*G06K 9/46* (2006.01)

(52) U.S. Cl.
CPC .......... *G06K 9/6211* (2013.01); *G06K 9/4671* (2013.01)

(58) Field of Classification Search
CPC ...... G06K 9/4604–9/4638; G06K 9/56; G06K 9/6201–9/6215; G06T 7/0079–7/0097; G06F 17/30244–17/3028
USPC ................ 382/199, 201, 205, 218–221, 305; 707/E17.019–E17.03
See application file for complete search history.

(56) References Cited

U.S. PATENT DOCUMENTS

| | | | |
|---|---|---|---|
| 4,183,013 A * | 1/1980 | Agrawala et al. ............ 382/173 |
| 5,499,306 A * | 3/1996 | Sasaki et al. ................. 382/291 |
| 6,424,746 B1 * | 7/2002 | Nishida ......................... 382/195 |
| 7,043,474 B2 * | 5/2006 | Mojsilovic et al. |
| 7,295,718 B2 * | 11/2007 | Park et al. .................... 382/305 |
| 7,478,091 B2 * | 1/2009 | Mojsilovic et al. |
| 7,657,100 B2 * | 2/2010 | Gokturk et al. .............. 382/209 |
| 7,657,126 B2 * | 2/2010 | Gokturk et al. .............. 382/305 |
| 8,131,066 B2 * | 3/2012 | Hua et al. ..................... 382/160 |
| 8,200,021 B2 * | 6/2012 | Iwamoto et al. ............. 382/195 |
| 8,270,724 B2 * | 9/2012 | Iwamoto et al. ............. 382/190 |
| 8,300,937 B2 * | 10/2012 | Wu et al. ...................... 382/173 |
| 8,634,654 B2 * | 1/2014 | van Zwol et al. ............ 382/203 |
| 8,718,369 B1 * | 5/2014 | Tompkins ......... G06F 17/30259  382/181 |
| 8,744,193 B2 * | 6/2014 | Iwamoto et al. ............. 382/195 |
| 2003/0195883 A1 * | 10/2003 | Mojsilovic et al. ............. 707/6 |
| 2005/0213818 A1 * | 9/2005 | Suzuki et al. ................ 382/190 |
| 2006/0143176 A1 * | 6/2006 | Mojsilovic et al. ............. 707/6 |
| 2007/0008515 A1 * | 1/2007 | Otani ....................... G01C 3/00  356/5.02 |
| 2007/0222859 A1 * | 9/2007 | Chang ................... G08G 1/017  348/148 |
| 2008/0025646 A1 * | 1/2008 | Aguera y Arcas ............... G06F 17/30277  382/305 |
| 2008/0144124 A1 * | 6/2008 | Samadani et al. ............ 358/453 |
| 2009/0016564 A1 * | 1/2009 | Ke et al. ....................... 382/100 |
| 2009/0252413 A1 * | 10/2009 | Hua et al. ..................... 382/170 |
| 2009/0268810 A1 * | 10/2009 | Dai ............................ G06T 9/20  375/240.12 |
| 2009/0282025 A1 * | 11/2009 | Winter et al. .................... 707/5 |

(Continued)

OTHER PUBLICATIONS

Romberg et al., "Scalable Logo Recognition in Real-World Images", ACM, Apr. 18, 2011.*

(Continued)

*Primary Examiner* — Aaron W Carter
(74) *Attorney, Agent, or Firm* — Berkeley Law & Technology Group, LLP

(57) ABSTRACT

Subject matter disclosed herein relates to image object recognition or retrieval.

18 Claims, 6 Drawing Sheets

(56) References Cited

U.S. PATENT DOCUMENTS

| | | | |
|---|---|---|---|
| 2010/0278436 A1* | 11/2010 | Tsai | G06K 9/3258 382/209 |
| 2011/0106805 A1* | 5/2011 | Bao et al. | 707/737 |
| 2011/0135205 A1* | 6/2011 | Rhee | G06T 7/60 382/195 |
| 2011/0158538 A1* | 6/2011 | Iwamoto et al. | 382/192 |
| 2011/0170782 A1* | 7/2011 | Iwamoto et al. | 382/190 |
| 2011/0229042 A1* | 9/2011 | Iwamoto et al. | 382/195 |
| 2011/0268319 A1* | 11/2011 | Niskanen et al. | 382/103 |
| 2011/0273442 A1* | 11/2011 | Drost | G06K 9/6211 345/419 |
| 2012/0133815 A1* | 5/2012 | Nakanishi | H04B 10/1141 348/333.02 |
| 2012/0147167 A1* | 6/2012 | Manson | G06K 9/00201 348/77 |
| 2012/0263385 A1* | 10/2012 | van Zwol et al. | 382/201 |
| 2012/0269432 A1* | 10/2012 | Wang et al. | 382/171 |
| 2012/0320433 A1* | 12/2012 | Xie et al. | 358/474 |
| 2013/0013578 A1* | 1/2013 | Yang et al. | 707/706 |
| 2013/0022280 A1* | 1/2013 | Liu et al. | 382/224 |
| 2013/0107071 A1* | 5/2013 | Tang et al. | 348/222.1 |
| 2013/0148903 A1* | 6/2013 | van Zwol et al. | 382/224 |
| 2013/0156348 A1* | 6/2013 | Irani et al. | 382/305 |
| 2014/0003739 A1* | 1/2014 | S V et al. | 382/284 |
| 2014/0101195 A1* | 4/2014 | Li et al. | 707/769 |
| 2014/0133763 A1* | 5/2014 | van Zwol et al. | 382/218 |
| 2014/0226906 A1* | 8/2014 | Kang | 382/197 |

OTHER PUBLICATIONS

Van Zwol, et al, "Efficient Image Object Retrieval Based on Spatially-Aware Indexing," SIGIR, 2011, Beijing, 10 Pages.

Bay, et al, "Speeded-Up Robust Features (SURF)," Computer Vision and Image Understanding, 110(3), 2008, http://staff.science.uva.nl/~cgmsnoek/CS294/papers/bay-surf-cviu.pdf, pp. 346-359 0.

Avrithis, et al, ". Feature Map Hashing: Sub-linear Indexing of Appearance and Global Geometry," ACM Multimedia,3 2010, http://image.ntua.gr/iva/files/mmfct06047-avrithis.pdf, 10 pages.

Sivic, et al, "Video Google: A Text Retrieval Approach to Object Matching in Videos," ICCV, 2003, http://web.cs.swarthmore.edu/~turnbull/cs97/f08/paper/sivic03.pdf, 8 Pages.

Ng, et al, "Matching of interest Point Groups with Pairwise Spatial Constraints," In Proceedings of the 17th International Conference on Image Processing (ICIP), ICIP'10, Hong Kong, 2010, IEEE, http://citeseerx.ist.psu.edu/viewdoc/download?doi=10.1.1.176.2085&rep=rep1&type=pdf, 4 Pages.

* cited by examiner

```
Neighbourhood similarity
scores ← ∅
qPoints ← getQueryPoints()                                    300
for all qPoints in qPoints do
    qPointScores ← ∅
    cPoints ← getCandidatePoints(qPoint.class)
    for all cPoint in cPoints do
        score = neighbourScore(qPoint, cPoint)
        if score > nnth then
            maxS = max(qPointScores[cPoint.image], score)
            qPointScores[cpoint.image] = maxS
        end if
    end for
    for all image in qPointScores do
        scores[image] +=qPointScores[image]
    end for
end for
```

FIG. 3

```
function neighbourScore(qPoint,cPoint)
q ← sort(qPoint.neighbours)
c ← sort(cPoint.neighbours)                                    400
score = 0
while notEmpty(q) and notEmpty(c) do
  if q.top().class==c.top().class then
     q.pop()
     c.pop()
     score = score + 1
  else if q.top().class> c.top().class then
     q.pop()
  else if q.top().class< c.top()class then
     c.pop()
  end if
end while
return score
```

FIG. 4

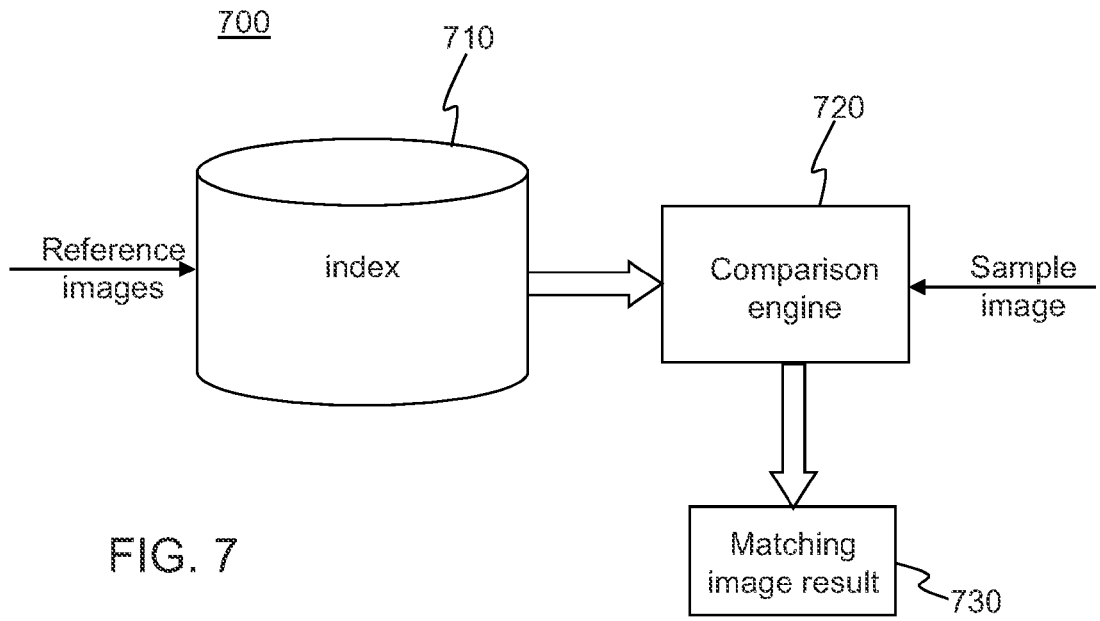

Edge based similarity
*scores* ← ∅
*bases* ← ∅
*qPoints* ← *getQueryPoints()*          800
For all *qPoint* in *qPoints* do
   *base* = *getBase(qPoint.class)*
   *bases[<base,qPoint.x, qPoint.y>].add(qPoint)*
end for
for all *<base,x,y>* in *bases* do
   *eqPoints* ← *bases[<base,x,y>]*
   for all *eqPoint* in *eqPoints* do
     *cPoints* ← *getCandidatePOints(eqPoint.signature)*
     for all *cPoint* in *cPoints* do
       *cbase* = *getBase(cPOint.class)*
       *key* =*<cbase,cPOint.x,cPoint.y>*
       *tScore[cPoint.image][key]*+=1
     end for
   end for
   for all *image* in *tScore* do
     *score[image]*+= *max(tScore[image])*
   end for
end for

IMAGE OBJECT RETRIEVAL

BACKGROUND

Field

Subject matter disclosed herein relates to image object recognition or retrieval.

Information

Enabling electronic devices, such as computing devices, to recognize objects in images has been a goal of computer vision for decades. Though there has been progress toward this goal, the task remains challenging. For example, recognizing particular objects posted on the Internet may involve processing an enormous amount of image information at a relatively high rate to be of practical utility for a user. For example, users of a popular social media website may upload more than 4000 images per minute. Accordingly, it may be desirable to more efficiently search for or recognize particular objects in an image at a relatively high processing rate.

BRIEF DESCRIPTION OF THE FIGURES

Non-limiting or non-exhaustive embodiments will be described with reference to the following figures, wherein like reference numerals refer to like parts throughout various figures unless otherwise specified.

FIGS. 3 and 4 list example pseudo-code, according to an embodiment;

FIG. 7 shows a schematic diagram of a process to query an edge index, according to an embodiment;

FIG. 8 lists example pseudo-code, according to an embodiment;

DETAILED DESCRIPTION

Figure 1:
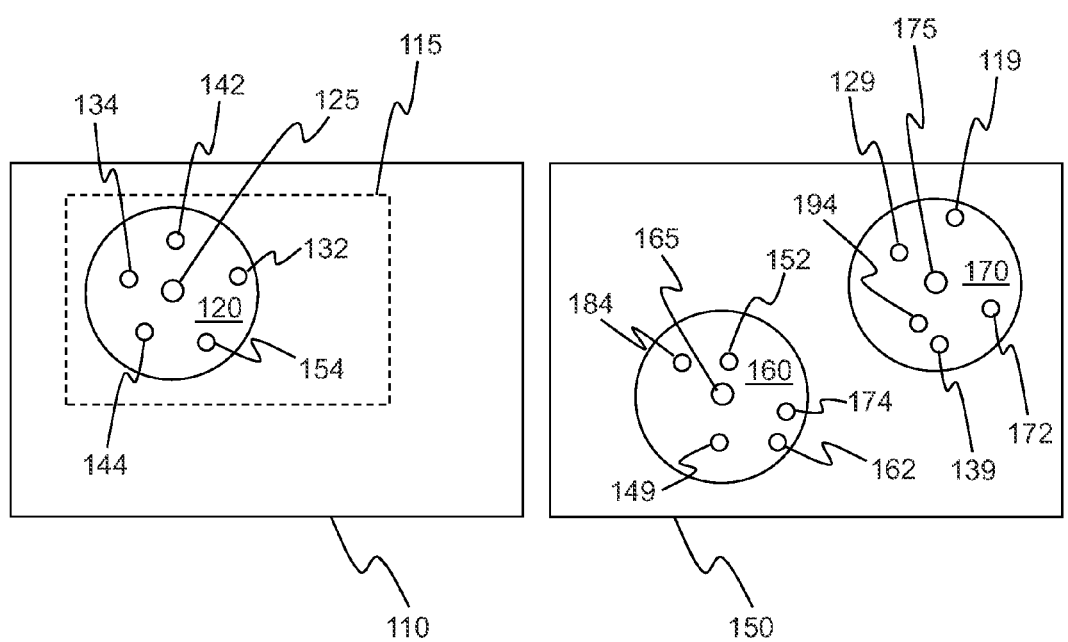
FIG. 1 shows interest points and various neighboring points in a sample image and a reference image, according to an embodiment.

Reference throughout this specification to "one embodiment" or "an embodiment" means that a particular feature, structure, or characteristic described in connection with the embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

In an embodiment, a process for recognition (e.g., image recognition) of particular patterns in images using special purpose computing devices or applying special purpose processors may involve techniques for recognizing similarities among two or more images. For example, local features of a sample image may be compared to local features of one or more reference images to determine if local features of the sample image comprise a particular pattern capable of being recognized. In one implementation, an edge index may be used in a process of comparing sample and reference images, for example. An edge index may include local feature information describing quantization of neighboring point-pairs encoded in edge signatures, for example. Of course, claimed subject matter is not limited to edges or edge indexes. Other arrangements of points, which may form polygons, for example, may be used. Image recognition may be used, to list merely a few examples, in Internet-type searches or to select advertisements based, at least in part, on identifying a recognized object, though claimed subject matter is not so limited.

Embodiments may apply to logos, images, patterns, or objects. For example, a process of image recognition may be applied to recognizing a logo, a geometrical pattern, an image of a building in a photo, lettering, a landscape in a photo, or other object of an image or photo, just to name a few examples.

Physical signals or states, hereinafter referred to interchangeably as "states" or "signals," such as electronic signals or states, for example, representing information states describing local features in a plurality of reference images that comprise objects may be extracted from the images. States describing local features in an image may comprise image descriptors. States representing image descriptors of reference images may be stored in an edge index and used during a process to recognize an object in a sample image in an embodiment.

A process of searching for a matching object in one or more reference images may include determining whether or which local features in the sample image are similar to local features in the one or more reference images. For example, two images containing similar-appearing regions or areas may have similar spatial (e.g., geometrical) layouts of local features. In other words, within these regions positions of local features relative to one another may be similar or at least approximately similar, for example, largely independent of image orientation, scale, or size of the region. Local features may comprise geometric patterns such as, for example, lines or edges, polygons, or other groups of points, in one possible embodiment, for example.

Interest points of an image may comprise states or signals representing image points or groups of image points that may be substantially invariant under transformation including rotation or other affine transformations. For example, pairs of interest points may be quantized and combined or grouped together to form edges (e.g., line segments) or other geometrical constructs (e.g. polygons) corresponding to local features of an image. Edges may have properties that, like interest points, may also be substantially invariant to a variety of transformations. In one implementation, an edge may comprise states representing a multi-dimensional vector having from several to as many as several hundred components describing a quantized edge signature, in one possible embodiment.

In an example embodiment, a process of recognizing an object in a sample image may involve comparing the object to a plurality of reference images that may include a geometrically similar representation. An object of a reference image may be represented by edges in one possible embodiment. Thus, in one embodiment, combinations of edges may be associated with objects sought to be identified. An edge index, for example, stored on a memory device, may comprise states or signals representing hundreds of thousands of combinations of edges. In an implementation, a method of searching for an object of a sample image may comprise quantizing image descriptors for the sample image, wherein the quantized image descriptors may include interest point neighborhood information. Quantized image descriptors may be at least approximately scale invariant. Quantized image descriptors may comprise interest points of an object, wherein relative positions of the interest points may be substantially constant with respect to varying perspectives of the object. Of course, claimed subject matter is not limited in this respect.

In one possible embodiment, a search may be performed for matches between quantized image descriptors in one or more sample images and quantized image descriptors of one or more reference images. Interest point neighborhood information in the form of electronic signals or states, for example, may comprise information regarding an interest point and a neighboring point of the interest point, for example. A neighboring point may be determined among a plurality of points based, at least in part, on a geometrical distance between the neighboring point and an interest point. In one implementation, quantized image descriptors of reference images may be stored in an edge index. In a non-limiting example, quantized image descriptors may comprise a plurality of values (e.g., distances between points, angles, or magnitudes of image pixel characteristics, just to name a few examples) referred to as "components," which may, for example, be stored as electronic or physical states, for example. In another implementation, stored components in an edge index, may comprise quantization identifications (IDs) of neighboring points of interest points in one or more reference images.

In an embodiment without limitations, in response to a search query to search for an object of a sample image, N signatures corresponding to an interest point and N neighboring points of the interest point of the sample image may be identified using an edge index, for example. Of course, details regarding indexes, such as type or size, are merely examples, and claimed subject matter is not so limited. Interest points may comprise quantized image descriptors generated using a speeded-up-robust-features (SURF) process, for example. Neighboring points may be determined at least approximately based, at least in part, on geometric distance from a candidate interest point in a sample image. A match between an object of a sample image and an object in a reference images may be determined by comparing N signatures to stored components in an edge index. Though claimed subject matter is not so limited, a geometrical shape, such as a rectangular bounding box, for example, may be formed around an object of a sample image to identify the object of the sample image for a search query. For example, a user may use a mouse or other pointing device to form a curve or geometrical shape that encloses a portion of an image.

To create an organized collection of stored information states regarding objects in reference images, information regarding multiple reference images may be collected. From reference images, signals or states representing detected region features may be extracted using any of a number of techniques, such as a Harris-Laplace detector or a hessian-affine detector, though claimed subject matter is not limited to a particular technique. Detected features may be described using descriptors, such as SURF, to detect or describe local features in images. Other descriptors may include Scale-Invariant Feature Transform (SIFT), Histogram of Oriented Gradients (HoG), Gradient Location Orientation Histogram (GLOH), or color SIFT, just to name a few examples.

Extracted local features of an image may comprise properties that allow local features to be detectable under changes in image scale, noise, illumination, or other transformations, for example. Local features, which may comprise stored electronic states representing points that lie on relatively high-contrast regions of an image, such as object edges, may be more robust to image tilt or affine transformations than other features in the image. For example, a region of an image may have a relatively high-contrast compared to another region of the image based, at least in part, on relative brightness of the region. In a non-limiting case, "contrast" may comprise a brightness difference between two regions of an image. Stored electronic states representing local features may be transformed to quantize the local features or descriptors to discrete visual "words" or labels that may form a "vocabulary," such as may be derived by k-means clustering, for example. K-means clustering is well-known and, therefore, shall not be described further. Of course, other techniques may likewise be used to derive a "vocabulary." Edges, for example, may comprise two visual words, which may represent two sets of local features of an image. In one implementation, a vocabulary may be relatively small, comprising perhaps several thousand visual words, though claimed subject matter is not so limited.

In an embodiment, a quantization class may be generated from two or more reference images. As described in further detail below, neighborhood similarity matching may be based, at least in part, on an assumption that two matching interest points describing the same object may share neighboring interest points within the same or a related quantization class. A systematic search for edges in one reference image that are similar to edges in another reference image may be performed. In this particular context, edges that are similar in reference images are described as edges that "match" across reference images. Edges that are determined to match across reference images for a quantization class may be collected into an edge index that includes matching edges for a plurality of quantization classes. In one implementation, an edge representation may be stored in a memory device as states or signals that represent a 64-bit integer, for example. Although subject matter is not limited, in a particular implementation, a technique to determine corresponding points on pairs of reference images in the past may have involved estimating the homography of pairs of reference images using random sample consensus (RANSAC). However, a potential advantage of some implementations in accordance with claimed subject matter is that one need not involve RANSAC. A variety of possible techniques, therefore, whether with or without RANSAC, are intended to be included within the scope of claimed subject matter.

To represent a quantization class, electronic states representing n reference images may be identified and matching edges may be determined for any combination of the reference images. That is, if there are n images per class, $n(n-1)/2$ image pairs may be matched per class. Matching edges may form a quantization class. In this context, the term "matching" refers to comparing a similarity of at least some local features of two or more regions of an image. Of course, these descriptions are merely examples, and claimed subject matter is not so limited.

FIG. 1 shows interest points and various neighboring points in a sample image 110 and a candidate image 150, according to an embodiment. Sample image 110 may include an object in a query to identify the same or similar objects in one or more other (e.g., reference) images. Candidate image 150 may comprise a reference image that includes one or more objects that may match an object of a query, for example. Sample image 110 or candidate image 150 may include any number of objects or interest points. For example, sample image 110 may include an object of a query that includes one query interest point 125 and five neighboring interest points 132, 134, 142, 144, and 154 within an area 120. Candidate image 150 may include two candidate matching objects of a query that include two candidate interest points 165 and 175, respectively, having five neighboring interest points 152, 165, 184, 149, and 162 within an area 160 and five neighboring interest points 119, 129, 194, 139, and 172 within an area 170.

Interest points, such as candidate interest points, query interest points, or their neighboring interest points, may be characterized by quantization IDs. In this context, "quantization ID" refers to, for example, a process for associating values, such as stored values, of image features (e.g., color, size, position, just to name a few examples) to interest points of an image, as discussed later. Any one of a variety of approaches to do so is possible and claimed subject matter is not intended to be limited to a particular approach. Accordingly, interest points may be considered to match one another or be different from one another based, at least in part, on a comparison of quantization IDs of the interest points. Correspondingly, objects in two or more images that include interest points may be considered to match one another or to be different from one another based, at least in part, on a comparison of the interest points.

Figure 2:
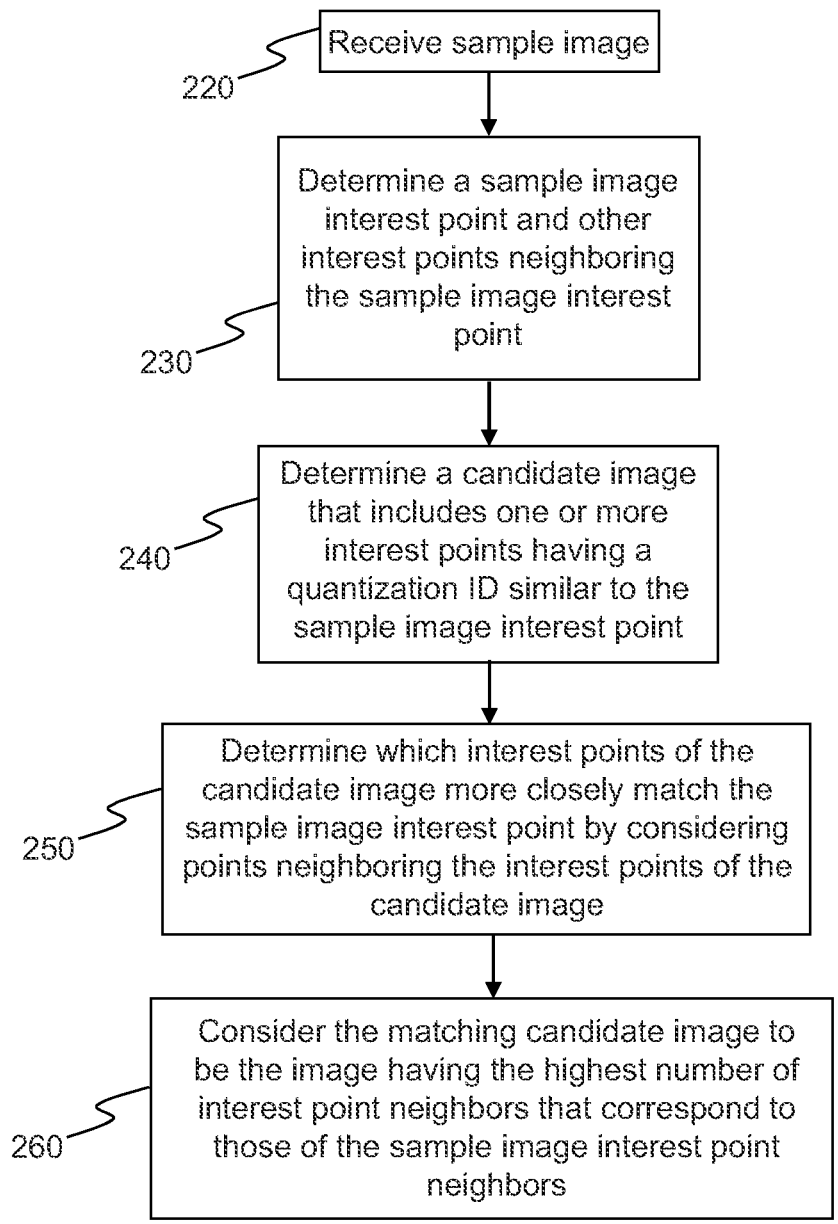
FIG. 2 is a flow diagram of an embodiment of a process to determine matching images.

FIG. 2 is a flow diagram of an embodiment of a process 200 to find one or more images that include objects that match an object of a sample image. For example, process 200 may be used to determine which, if any, object in candidate image 150 matches an object in sample image 110. Embodiments may include blocks in addition to those shown and described in FIG. 2, fewer blocks than those shown and described in FIG. 2, blocks occurring in a different order than those shown and described in FIG. 2, or any combination thereof. At block 220, through user selection, a sample image may be obtained, such as provided by a processor executing an application such as a Web browser or search engine, just to name a few examples. In one implementation, referring to FIG. 1, a geometrical shape 115, such as a bounding box, for example, may be used to identify an object in a sample image that a user may select for a search of similar or identical objects in other images. For example, a geometrical shape 115 may be used to identify an image search by delineating at least a portion of sample image 110. A user may select an object among a number of objects in an image. A user selection may be creating a bounding box or other shapes around an object of interest. A geometrical shape superimposed on a sample image may be graphically shown on a computer display or formed by a user via any number of techniques, such as by manipulating a computer mouse or pointer, for example. Of course, in a different embodiment, a user may click on an object to prompt an application executed by a processor, for example, to form a geometrical shape to enclose a portion of an image including the object. A user may perform other techniques to select an object of interest, and claimed subject matter is not limited in this respect. In another embodiment, a user need not be involved in a selection of an object. For example, an application executed by a processor may determine which object among a plurality of object is to be used in a search of similar or identical objects in other images.

At block 230, within geometrical shape 115 a query interest point 125 and interest points neighboring query interest point 125 may be determined. Geometrically, query interest point 125 in sample image 110 may be relatively near any number of neighboring interest points. In this context, points that are "relatively near" one another may be closer to one another than a threshold distance, for example. Of course, other approaches are possible. Claimed subject matter is intended to include other approaches. Nonetheless, continuing with this example, as mentioned above, query interest point 125 may have neighboring interest points 132, 134, 142, 144, and 154.

At block 240, a candidate image that includes one or more interest points, for example, having a quantization ID similar to the sample image interest point may be determined. In a particular example, candidate image 150 may contain two candidate interest points 165 and 175 having the same or similar quantization ID as query interest point 125. In a particular example, interest points 132 and 142 may have the same or similar quantization ID as one another, and interest points 134, 144, and 154 may have the same or similar quantization ID as one another (and different than that of interest points 132 and 142). Similarly, query interest point 165 in candidate image 150 may have neighboring interest points 152, 165, 184, 149, and 162 within an area 160. In a particular example, interest points 152 and 162 may have the same or similar quantization ID as one another, and interest points 174 and 184 may have the same or similar quantization ID as one another (and different than that of interest points 152 and 162). Also, query interest point 175 in candidate image 150 may have neighboring interest points 119, 129, 194, 139, and 172 within an area 170. In a particular example, interest points 119, 129 and 139 may have the same or similar quantization ID as one another (and different than that of interest points 194 and 172).

As mentioned above, candidate interest points 165 and 175 may have the same or similar quantization ID as query interest point 125. However, one of the two objects represented by interest points 165 and 175 may be a closer match to the object represented by query interest point 125 than the other. For example, one of the two objects represented by interest points 165 and 175 may comprise image features that more closely resemble the object represented by query interest point 125 compared to the other of the two objects. At block 250, to determine the closer matched object, interest points and their respective neighbors may be considered. Thus, query interest point 125 and its neighboring interest points may be compared to candidate interest point 165 and its neighboring interest points. Also, query interest point 125 and its neighboring interest points may be compared to candidate interest point 175 and its neighboring interest points. To illustrate an example of comparing interest points, candidate interest point 165 may match query interest point 125 more closely than candidate interest point 175 if neighboring interest points of candidate interest point 165 also match neighboring interest points of query interest point 125 more closely than those of candidate interest point 175. For example, neighboring interest points 152, 165, 184, and 162, of candidate interest point 165 match neighboring interest points 132, 134, 142, 144, and 154 of query interest point 125. In contrast, neighboring interest points 172 and 194 of candidate interest point 175 may match neighboring interest points of query interest point 125. If none of the neighboring interest points match between two interest points, a determination may be made that the two interest points are not similar, despite their matching quantization IDs. At block 260, if in a candidate image more than one interest point corresponds with a query interest point, a candidate interest point with a highest number of corresponding neighbors may, for example, be considered a match.

FIGS. 3 and 4 list example pseudo-code, according to embodiments. Embodiment 300 may comprise a formal description of a matching strategy, where threshold nnth may be used as a lower number of corresponding near-neighbors for a query interest point and a candidate interest point. Embodiment 400 may comprise a function to test a neighborhood similarity of two interest points. For one possible embodiment, neighborhood similarity matching may comprise two parameters. In an embodiment, whether a pair of interest points may be considered the same or similar may be based, at least in part, on a number of nearest neighbors (e.g., 5, 10, 15, or 20, just to list a few examples) used for matching and a threshold, for example. Furthermore, a performance of a matching strategy may depend, at least in part, on a size of a visual vocabulary (e.g., 3000, 5000, 10000, or 12000, just to list a few examples). Relatively large visual vocabulary sizes may reduce false positive matches. However, quantization error may increase as vocabulary size increases. For example, quantization error may result in two SURF descriptors that are relatively similar in Euclidean space to receive different quantization IDs if the two descriptors are between two centroids, such as where a k-means approach is applied in a possible embodiment, for example.

In an embodiment, descriptors, which may comprise points or combinations of points, may be determined using any of a number of techniques, as described above, such as SURF, for example. Descriptors may have nearly invariant properties that allow the descriptors to be detectable under transformation of an underlying image area or object, such as rotation, noise, scale, or illumination, for example. Descriptors, which may comprise points that lie on relatively high-contrast regions of an image, such as object edges, may be more robust to image tilt or other transformations than other descriptors in the image. In this context, "relatively high-contrast regions" may refer to where contrast is sufficiently distinguishable between two regions, for example. In an implementation, descriptors may be grouped into pairs of points. Parameters of a pair of points may be identified to subsequently characterize or quantize the pair of points to generate a visual word or edge. For example, a visual word or edge may comprise quantized parameters of a pair of points, though claimed subject matter is not so limited.

In similar embodiments, spatial information may be embedded in results of quantization through various approaches. For example, in an embodiment, given a base interest point in an image, there may be N outgoing edges that connect to N nearest neighbors, which may be referred to as offset points. With one possible approach, a base interest point may lead to N entries in an edge index, and a quantization class for individual index entries may comprise a combination of base interest point and offset quantizations, also referred to as an edge signature in this context. Similar edges may potentially be found in similar objects and a matching base point may potentially contain one or more offset points as neighbors. Using two quantizations to create a signature may introduce a higher degree of specificity that results in less candidates per index entry, for example, in a possible embodiment. In other words, increasing the number of features used to characterize a local feature may reduce the number of interest points that qualify as candidates. One approach may also potentially result in a reduction of noise if coherent pairs are considered during a matching process. A reduction of candidates to be processed at query time may be useful for image object retrieval given a relatively large number of descriptors extracted from a single image, for example.

Likewise, in one implementation, a sign of the Laplacian of a signal sample value that may represent an edge signature may be used as a feature to characterize a number of interest points. For example, a SURF descriptor may include information described by the expression <x><y><Laplacian><descriptor>. Quantizing descriptors may lead to a visual word or quantization ID. In an example, descriptors from two images may be relatively similar in Euclidean space, possibly leading to the same visual word, but if the descriptors have different <Laplacian> signs, the descriptors may be considered non-comparable. According to one implementation, the sign of the Laplacian may be used to determine a visual word. In an example, the sign of the Laplacian may comprise values −1 or +1. The expression "QuantizationID=getQuantizationID(descriptor)*(sign of the Laplacian)", however, may double the number of visual words compared to the case of not considering the sign of the Laplacian. Referring to FIG. 4, two points having relatively close descriptors but with different Laplacian signs may not match in Line 6 of pseudo-code in embodiment 400. However, the following pseudo-code may be used to determine an edge signature:

QuantizationID1=getQuantizationID(descriptor1)
QuantizationID2=getQuantizationID(descriptor2)
Signature=QuantizationID1+sign1+QuantizationID2+sign2

Figure 5:
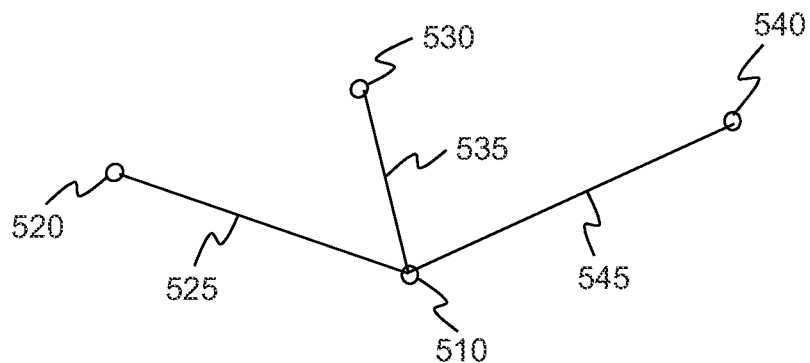
FIG. 5 illustrates a base point and neighboring points that may form edges, according to an embodiment.

FIG. 5 illustrates a base interest point 510 and neighboring interest points 520, 530, and 540 that may be included in an object of an image, according to an embodiment. Edges, which may be quantized to form edge signatures, for example, may comprise line segments extending from a base interest point to a neighboring interest point. For example, base interest point 510 and neighboring interest point 520 may form an edge 525, base interest point 510 and neighboring interest point 530 may form an edge 535, and base interest point 510 and neighboring interest point 540 may form an edge 545, in an example.

Although one particular implementation may employ edges in which two points are associated, for example, likewise, groups of N points may be associated in an index. For example, a triangle index, with N being 3, may be constructed using 3 near neighbors per point. Of course, N greater than two or three may also be employed. However, continuing with an example of N being 3, given a base point A with three neighbors B, C and D, one may generate the following signature entries in an index, such as a geometric index:

A+B+C

A+B+D

A+C+B

A+D+B.

Another aspect in one possible implementation may relate to scaling. Neighboring points associated with a particular object in a sample image, for example, may remain relatively close to one another or to a particular object in a reference image under rotation, viewpoint changes, or relatively small changes in scale. On the other hand, however, in some cases relatively close proximity of neighboring points or objects may not be maintained under relatively large scale changes. For example, a greater number of interest points in an image may become relatively proximate as image detail (e.g., scale) is increased. In one implementation, a signature, such as an edge signature for an expanded-scale image, may include a greater number of neighboring points compared to that of an edge signature for the same object having a relatively small scale. A variety of approaches are possible. For example, signatures may be constructed for neighboring points that have a larger scale than a particular interest point, but otherwise may not be constructed. Alternatively, a balanced sampling of signatures with larger and smaller neighboring scales may be included in an index with a quantized image descriptor comprising scale of a particular interest point, for example. Of course, claimed subject matter is not limited in scope to these possible alternative embodiments.

Figure 6:
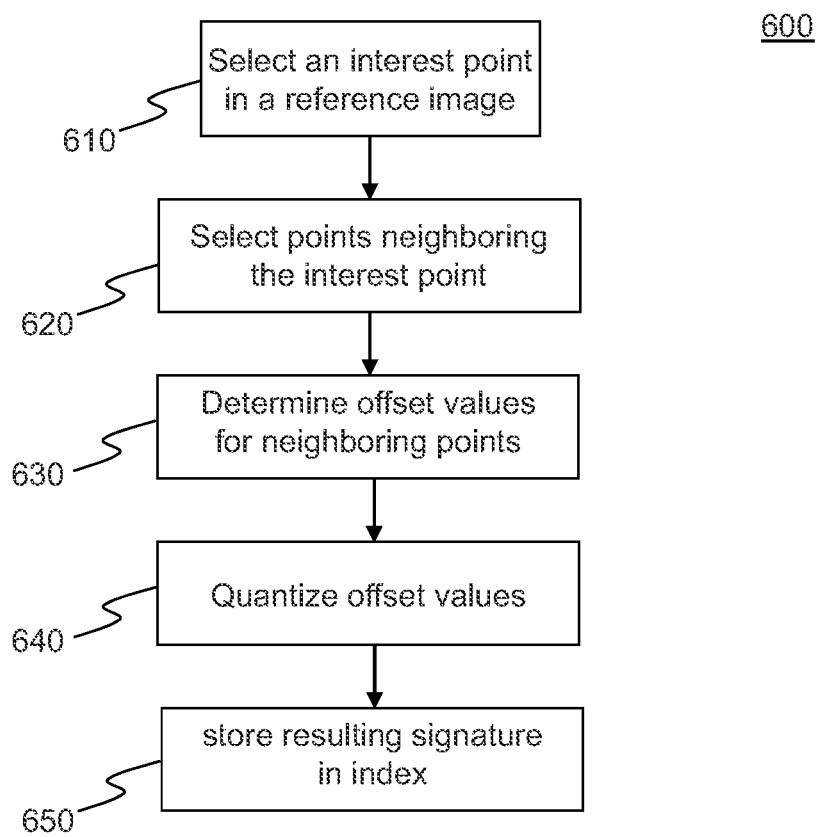
FIG. 6 is a flow diagram of an embodiment of a process to generate an edge index from reference images.

FIG. 6 is a flow diagram of an embodiment of a process 600 to generate an index from one or more reference images. At block 610, a particular interest point, such as 510, for example, may be determined among any number of points in a reference image. At block 620, points neighboring a particular interest point, such as neighboring points 520, 530, or 540, for example, may be determined. At block 630, offset values, which, for example, may comprise a geometrical distance between a particular interest point and individual neighboring points, may be determined. At block 640, offset values for a base point may be quantized using a process that may involve binary representation of a quantization of a base point or one of its offset points. Two or more quantizations may be concatenated to form a single number representing a signature, such as a polynomial signature, for example, although claimed subject matter is not so limited. In one implementation, a sign of the Laplacian of a signal sample value that represents a signature may be added to create different signatures, such as for a corresponding base and offset classes having different Laplacian signs.

At block 650, resulting signatures may be stored in an index, for example. Of course, described details of process 600 are merely examples, and claimed subject matter is not so limited.

FIG. 7 shows a schematic diagram of a process to query an index, according to an embodiment 700. Index 710 may comprise an index of edge signatures for a plurality of reference images. In one implementation, a process 600 may be used to populate index 710 with signatures. A number of signatures included in index 710 may be based, at least in part, on a size of a visual vocabulary of a plurality of reference images. In an implementation, a number of possible signatures using a vocabulary of size K may be $K^2$ if no other information is used, for example. However, if the sign of the Laplacian in a descriptor for base or offset points is used, the number of possible signatures may increase to $(2*K)^2$, though claimed subject matter is not so limited. Likewise, as discussed, signatures other than edge signatures may be employed in an embodiment.

A comparison engine 720, which may comprise a processor including code executable by a processor, for example, may calculate signatures of a sample image and compare the signatures with those stored in an index, such as 710, for example. One or more reference images associated with signatures in an index, such as 710, that may match with signatures of a sample image may be retrieved as a result of an image search, for example. A computing platform comprising a server may provide one or more matching images to an Internet browser application 730 executed by a client computing device, for example; although, of course, claimed subject matter is not limited in scope to an illustrative embodiment.

FIG. 8 lists example pseudo-code, according to an embodiment. Embodiment 800 may comprise a formal description of matching calculations between a query image and images or other electronic documents in a collection. At query time, N signatures may be formed for individual query points and their respective nearest neighbors. Query signatures may be grouped by <base,x,y>. An upper-valued number of matching offset interest points per group and a candidate image may comprise a score credited for that query point and the corresponding candidate image. Of course, details of embodiment 800 are merely examples, and claimed subject matter is not so limited.

Figure 9:
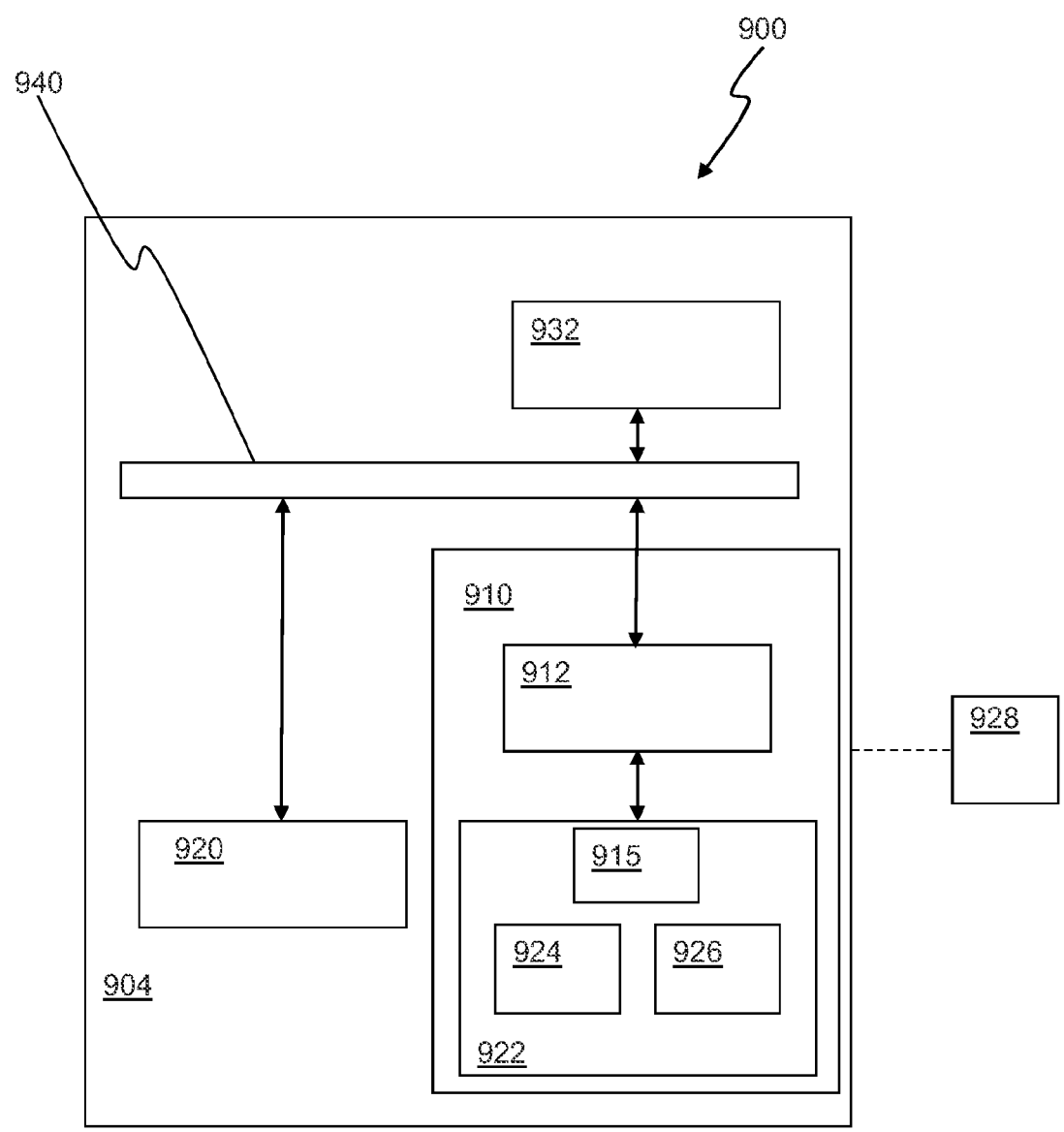
FIG. 9 is a schematic of an embodiment of a computing system.

FIG. 9 is a schematic diagram illustrating an embodiment of a computing system 900. A computing device may comprise one or more processors, for example, to execute an application or other code. For example, among other things, an application may perform process 200 or 600 described above. In a particular implementation, computing system 900 may perform a candidate interest point discriminating process for two or more candidate interest points of an image, wherein the discriminating process may be capable of: ranking the two or more candidate interest points based, at least in part, on quantization IDs of respective neighboring points of the two or more candidate interest points. In one implementation, candidate interest points may comprise quantized image descriptors, such as may be generated using a SURF process, for example. Neighboring points of a candidate interest point may be identified based, at least in part, on geometric distance from the candidate interest point in an image, for example, though claimed subject matter is not so limited.

In another particular implementation, an apparatus may comprise computing system 900 (e.g., a special purpose computing system) to receive electronic signals representing an image, transform electronic signals to encode a geometric arrangement of points of an object in the image, quantize pairs of the points, and store the quantized pairs of the points in the index (e.g., an edge index). An image may comprise a reference image, for example. A geometric arrangement of points may be approximately scale invariant or comprise hessian-affine features, for example. In one implementation, points may comprise image descriptors of an object, wherein relative positions of the points may be substantially constant with respect to varying perspectives of the object. As described above, one or more quantized pairs of points may comprise a quantized interest point and a quantized neighboring point of the interest point, for example.

A computing device 904 may be representative of any device, appliance, or machine that may be employed to manage memory device 910. Memory device 910 may include a memory controller 915 and a memory 922. By way of example, but not limitation, computing device 904 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or information storage service provider or system; or any combination thereof.

All or part of various devices, such as shown in system 900, or processes and methods such as described herein, for example, may be implemented using or otherwise including hardware, firmware, software, or any combination thereof (although this is not intended to refer to software per se). Thus, by way of example, but not limitation, computing device 904 may include at least one processing unit 920 that is operatively coupled to memory 922 via a bus 940 and memory controller 915. Processing unit 920 may be representative of one or more circuits to perform at least a portion of an information computing procedure or process. For example, a process to identify an object may include quantizing image descriptors for a particular image, searching for matches between determined groups (e.g., an interest point and its neighbors) of the quantized image descriptors and groups in an index of a collection of reference images, for example.

By way of example but not limitation, processing unit 920 may include one or more processors, controllers, microprocessors, microcontrollers, application specific integrated circuits, digital signal processors, programmable logic devices, field programmable gate arrays, the like, or any combination thereof. Processing unit 920 may include an operating system to communicate with memory controller 915. An operating system may, for example, generate commands to be sent to memory controller 915 over or via bus 940. Commands may comprise read or write commands, for example.

Memory 922 may be representative of any information storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

Secondary memory 926 may include, for example, the same or similar type of memory as primary memory or one or more information storage devices or systems, such as, for example, a disk drive, an optical disc drive, a tape drive, a solid state memory drive, etc. In certain implementations, secondary memory 926 may be operatively receptive of, or otherwise able to couple to, a computer-readable medium 928. Computer-readable medium 928 may include, for example, any medium able to carry or make accessible signal or state information, code, or instructions for one or more devices, such as in system 900.

Computing device 904 may include, for example, an input/output 932. Input/output 932 may be representative of one or more devices or features able to accept or otherwise introduce human or machine produced signal inputs, or one or more devices or features able to deliver or provide human or machine comprehendible signal outputs. By way of example but not limitation, input/output device 932 may include a display, speaker, keyboard, mouse, trackball, touch screen, signal port, etc.

It will, of course, be understood that, although particular embodiments have just been described, claimed subject matter is not limited in scope to a particular embodiment or implementation. For example, one embodiment may be in hardware, such as implemented on a device or combination of devices, for example. Likewise, although claimed subject matter is not limited in scope in this respect, one embodiment may comprise one or more articles, such as a storage medium or storage media that may have stored thereon instructions capable of being executed by a specific or special purpose system or apparatus, for example, to result in performance of an embodiment of a method in accordance with claimed subject matter, such as one of the embodiments previously described, for example. However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In some circumstances, operation of a memory device, such as a change in state from a binary one to a binary zero or vice-versa, for example, may comprise a transformation, such as a physical transformation. With particular types of memory devices, a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change, such as a transformation in magnetic orientation and/or a transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. A method of matching sample images with reference images utilizing one or more special-purpose computing devices including one or more processors coupled to one or more memory devices, comprising:

accessing computer instructions from the one or more memory devices coupled to the one or more special-purpose computing devices for execution on the one or more processors of the one or more special-purpose computing devices;

executing the accessed computer instructions utilizing the one or more computing devices; and storing, in the one or more memory devices coupled to the one or more special-purpose computing devices, any results of having executed the accessed computer instructions on the one or more processors of the one or more special-purpose computing devices, wherein executing the accessed computer instructions comprises:
    superimposing, responsive to receipt of one or more signals from a user interface, a shape around an object of interest in at least a portion of an image;
    quantizing image descriptors for the at least a portion of the image, the quantized image descriptors including one or more sample image interest points and one or more interest points neighboring the one or more sample image interest points;
    determining whether two or more image interest points belong to the same or related quantization class, based, at least in part, on testing for neighborhood similarity of two or more sample image interest points;
    quantizing edges between the one or more sample image interest points and the one or more interest points neighboring the one or more sample image interest points to form an edge index for the at least a portion of the image, the quantized image descriptors including a geometrical distance and an angle between the one or more sample image interest points and the one or more interest points neighboring the one or more sample image interest points;
    searching for matches between the edge index for the at least a portion of the image and an edge index of reference images based, at least in part, on the tested neighborhood similarity; and
    providing one or more of the reference images to an Internet browser responsive to searching for the one or more matches.

2. The method of claim 1, further comprising determining offset values which comprise the geometrical distance between the one or more sample image interest points and the one or more interest points neighboring the one or more sample image interest points.

3. The method of claim 2, wherein the one or more sample image interest points and the one or more interest points neighboring the one or more sample image interest points include a scale, and wherein
    forming one or more edge signatures between the one or more sample image interest points and the one or more points neighboring the one or more sample image interest points based at least in part on the scale.

4. The method of claim 1, wherein magnitudes of image pixel characteristics of reference images are stored in the edge index of reference images.

5. The method of claim 4, wherein quantization identifications (IDs) of the one or more interest points neighboring one or more reference image interest points are stored in the edge index for the at least a portion of the image and the edge index of reference images.

6. The method of claim 4, further comprising:
    in response to a search query to search for an object of the at least a portion of the image, forming N signatures for a sample image interest point and N points neighboring the sample image interest point; and
    comparing the N signatures to components stored in the edge index to determine a match between the object of the at least a portion of the image and an object in the reference images.

7. The method of claim 1, further comprising quantizing image descriptors that are at least approximately scale invariant.

8. The method of claim 7, wherein the quantized image descriptors describe interest points of an object, wherein relative positions of the interest points are substantially constant with respect to varying perspectives of the object.

9. An apparatus to match sample images with reference images utilizing one or more special-purpose computing devices including one or more processors coupled to one or more memory devices, comprising:
    a computing device to:
        access computer instructions from the one or more memory devices coupled to the one or more special-purpose computing devices for execution on the one or more processors of the one or more special-purpose computing devices;
    execute the accessed computer instructions utilizing the one or more computing devices; and
    store, in the one or more memory devices coupled to the one or more special-purpose computing devices, any results of having executed the accessed computer instructions on the one or more processors of the one or more special-purpose computing devices, wherein executing the accessed computer instructions comprise instructions to:
        execute computer instructions to superimpose, responsive to receipt of one or more signals from a user interface, a shape around an object of interest in at least a portion of an image;
        quantize image descriptors for at least a portion of an image, the quantized image descriptors to include one or more sample image interest points and one or more interest points to neighbor the one or more sample image interest points;
        determine whether two or more image interest points belong to the same or related quantization class, based, at least in part, on testing for neighborhood similarity of two or more sample image interest points;
        quantize edges between the one or more sample image interest points and the one or more interest points to neighbor the one or more sample image interest points to form an edge index for the at least the portion of the image, the quantized image descriptors to include a geometrical distance and an angle between the one or more sample image interest points and the one or more interest points to neighbor the one or more sample image interest points;
        search for matches between the edge index for the at least a portion of the image and an edge index of reference images based, at least in part, on the tested neighborhood similarity; and
        provide one or more of the reference images to an Internet browser responsive to searching for the one or more matches.

10. The apparatus of claim 9, wherein magnitudes of image pixel characteristics of reference images are stored in the edge index.

11. The apparatus of claim 10, wherein quantization identifications (IDs) of the one or more interest points to neighbor one or more interest points of the reference images.

12. The apparatus of claim 10, further comprising:
    in response to a search query to search for an object of the at least a portion of the image, the computing device to form N signatures for a sample image interest point and N interest points to neighbor the sample image interest point; and to compare the N signatures to components to be stored in the edge index to determine a match between the object of the at least a portion of the image and an object in the reference images.

13. The apparatus of claim 9, further comprising quantizing image descriptors that are to be at least approximately scale invariant.

14. An apparatus to match sample images with reference images utilizing one or more special-purpose computing devices including one or more processors coupled to one or more memory devices, comprising:
- means for accessing computer instructions from the one or more memory devices coupled to the one or more special-purpose computing devices for execution on the one or more processors of the one or more special-purpose computing devices;
- means for executing the accessed computer instructions utilizing the one or more computing devices; and
- means for storing, in the one or more memory devices coupled to the one or more special-purpose computing devices, any results of having executed the accessed computer instructions on the one or more processors of the one or more special-purpose computing devices, wherein executing the accessed computer instructions comprises:
  - means for superimposing, responsive to receipt of one or more signals from a user interface, a shape around an object of interest in at least a portion of an image;
  - means for quantizing image descriptors for the at least a portion of the image, the quantized image descriptors to include interest point neighborhood state parameters;
  - means for determining whether two or more image interest points belong to the same or related quantization class, based, at least in part, on testing for neighborhood similarity of two or more sample image interest points;
  - means for quantizing edges between one or more sample image interest points and one or more interest points neighboring the one or more sample image interest points to be stored in an edge index for the at least a portion of the image, the quantized image descriptors including a geometrical distance and an angle between the one or more sample image interest points and the one or more interest points neighboring the one or more sample image interest points;
  - means for searching for matches between the edge index for the at least a portion of the image and an edge index of reference images based, at least in part, on the tested neighborhood similarity; and
  - means for providing one or more of the reference images to an Internet browser responsive to searching for the one or more matches.

15. The apparatus of claim 14, wherein components to be stored in the edge index of reference images to comprise quantization identifications (IDs) of one or more interest points neighboring one or more interest points in the reference images.

16. The apparatus of claim 14, wherein the means for quantizing comprises means for forming N signatures for a sample image interest point and N interest points neighboring the sample image interest point; and
the means for searching comprising means for comparing the N signatures to components to be stored in the edge index for the image to determine a match between an object of the at least a portion of the image and an object in the reference images.

17. The apparatus of claim 14, further comprising quantizing image descriptors that are to be at least approximately scale invariant.

18. The method of claim 6, wherein the shape for superimposing around an object of interest in the at least a portion of the image comprises a geometrical shape.

* * * * *